A. W. LIGHTBURNE.
GATE OPERATOR.
APPLICATION FILED MAR. 22, 1915.
1,156,161.
Patented Oct. 12, 1915.
2 SHEETS—SHEET 1.
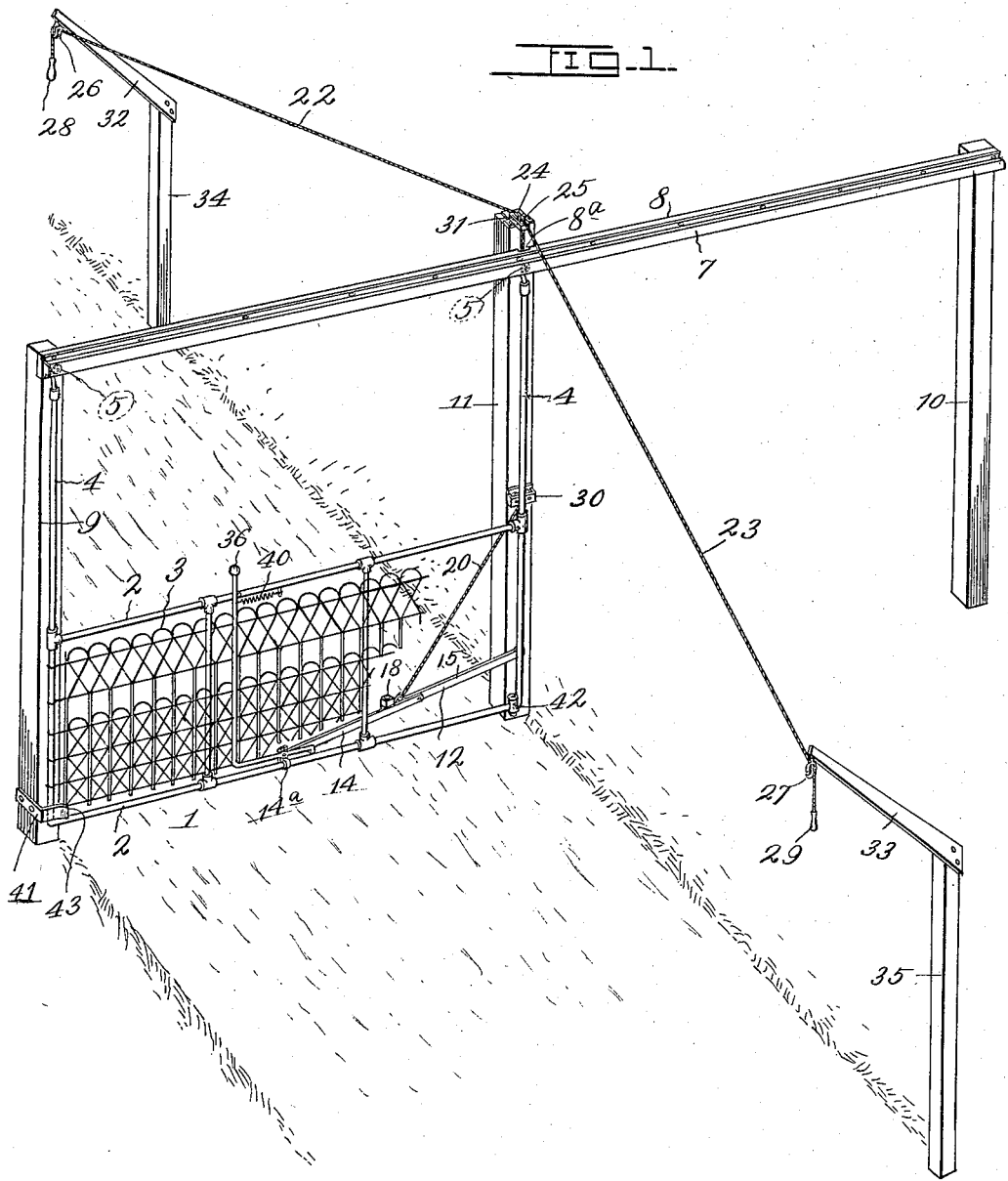
WITNESSES:
R. E. Hamilton
Fred C. Fischer.
INVENTOR:
Alvan W. Lightburne.
BY
F. G. Fischer,
ATTORNEY.

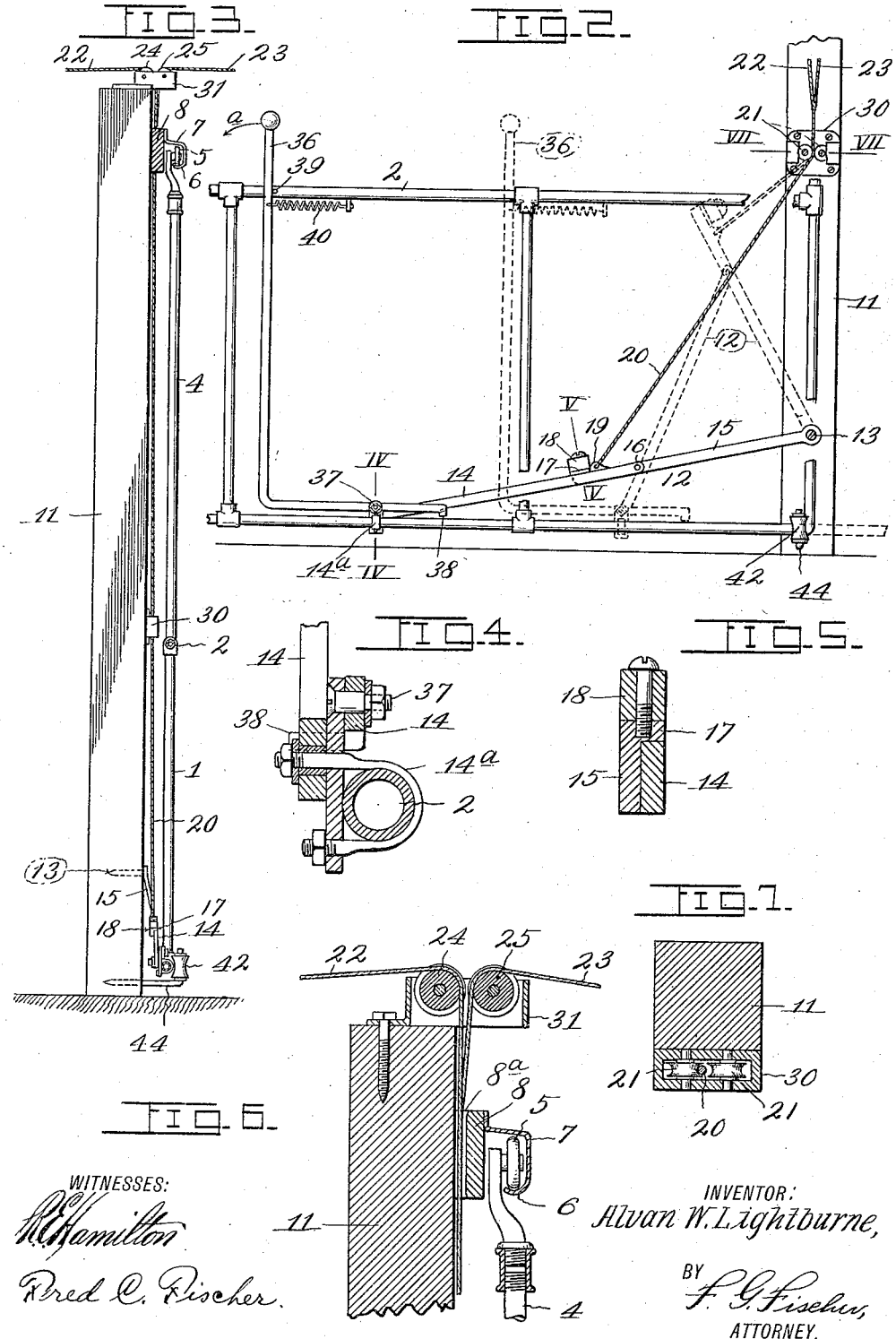

UNITED STATES PATENT OFFICE.

ALVAN W. LIGHTBURNE, OF LIBERTY, MISSOURI.

GATE-OPERATOR.

1,156,161.     Specification of Letters Patent.     Patented Oct. 12, 1915.

Application filed March 22, 1915. Serial No. 16,072.

*To all whom it may concern:*

Be it known that I, ALVAN W. LIGHTBURNE, a citizen of the United States, residing at Liberty, in the county of Clay and State of Missouri, have invented certain new and useful Improvements in Gate-Operators, of which the following is a specification.

My invention relates to improvements in gate operators and one object of the invention is to provide a novel operator which may be manipulated from either side of the gate without alighting from a vehicle.

A further object of the invention is to provide means whereby the gate can be readily opened by a pedestrian.

Another feature of the invention is to provide an automatic lock for securing the gate in closed position, so that it cannot be opened by hogs, cattle, etc.

Other objects of the invention will hereinafter appear, and in order that said invention may be fully understood, reference will now be made to the accompanying drawings, in which:

Figure 1 is a perspective view of the gate in closed position, and partly broken away. Fig. 2 is a broken side elevation of the gate in closed position in full lines, and partly open in dotted lines. Fig. 3 is a vertical section, enlarged. Fig. 4 is a detail sectional view, enlarged, on line IV—IV of Fig. 2. Fig. 5 is a detail sectional view, enlarged, on line V—V of Fig. 2. Fig. 6 is a sectional view, enlarged, of certain parts disclosed by Fig. 3. Fig. 7 is a cross section, enlarged, on line VII—VII of Fig. 2.

1 designates the gate proper, the frame of which is, preferably, made of gas pipe 2, covered with wire netting 3, of plain or ornamental design. The ends of the gate 1 have upwardly extending arms 4, provided at their upper ends with rollers 5, which traverse an overhead track 6, having a housing 7, to exclude sleet, snow, and other foreign matter apt to interfere with the travel of the rollers 5 on the track 6.

The upper margin of the housing 7 is firmly secured to the adjacent side of a horizontal timber 8, extending transversely across the road and secured at one end to a post 9 and at its opposite end to a post 10. The intermediate portion of the timber 8 is secured to a post 11 arranged on the opposite side of the road from the post 9, as disclosed by Fig. 1.

12 designates a toggle lock, one end of which has a pivotal connection 13 with the post 11, while its opposite end has a pivotal connection with a U-bolt 14ª, embracing the lower side of the gate 1. The toggle lock 12 consists of two members 14 and 15, pivotally connected at 16, beyond which the member 15 extends and terminates in a lip 17, which engages the upper edge of the member 14, when the toggle is in the extended position shown by full lines (Fig. 2). The lip 17 has a weight 18 thereon to hold the toggle in extended position, so that the gate cannot be opened by animals pushing upward and backward thereon.

The toggle member 15 has an eye 19 adjacent the lip 17, to receive the lower end of a cable 20, which runs upward between a pair of rollers 21, then continues in two strands 22 and 23 which pass through a groove 8ª in the timber 8, and then run over rollers 24, 25, 26 and 27, from the two latter of which they depend and are provided with handles 28 and 29, respectively.

The rollers 21 are mounted in a housing 30, secured to the intermediate portion of the post 11. The rollers 24 and 25 are mounted in a housing 31 at the top of the post 11. The rollers 26 and 27 are suspended from inclined overhead arms 32 and 33, secured to the upper ends of posts 34 and 35, respectively, arranged beside the road and far enough from the opposite sides of the post 11 to permit a person to drive up and open and close the gate without dismounting.

For the convenience of pedestrians, I have provided a hand lever 36, pivotally-mounted at the lower side of the gate on a bolt 37 and terminating at its lower end in a finger 38, which folds the toggle lock 12 when said lever is pulled in the direction of arrow *a* (Fig. 2), so that the gate can be opened. When the lever 36 is released it is drawn back to normal position against a stop-pin 39, by a retractile spring 40.

When the gate occupies the closed position shown by Fig. 1, it is held from lateral movement in one direction by the posts 9 and 11, and from lateral movement in the opposite direction by a stop 41 and a roller 42. The stop 41 is secured to the lower portion of the post 9 and has an outwardly turned end 43 to guide the gate between said stop and the post 9, as it approaches the closed position. The roller 42 is mounted upon a right angular support 44, screwed or driven into the lower portion of the post 11.

When the gate is in closed position, it is reliably locked in such position by the inclined toggle 12 with its weight 18. However, the gate can be readily opened by a quick pull upon either of the handles 28—29, as such operation folds the toggle, as indicated by the dotted lines (Fig. 2), and causes it to pull the gate open. The momentum acquired by the gate, together with aid of the weight 18, causes said gate to move toward the post 10 until stopped by the lip 17 contacting the edge of the member 14 of the toggle 12. After driving through the gate-way, the gate is closed by a rapid pull upon the opposite handle. The closing movement of the gate, like its opening movement, is limited by the toggle 12, hence shock is not imparted to the gate on reaching the end of either movement.

From the foregoing description it is apparent that I have provided a gate which is of comparatively simple, inexpensive, and durable construction, and well adapted for the purposes intended.

Having thus described my invention, what I claim and desire to secure by Letters Patent, is:

1. In combination with a sliding gate and a post adjacent thereto, a toggle lock composed of two pivoted members, a lever having a vertical and a lower horizontal arm, the latter pivoted between its ends to the lower horizontal rail of the gate and having a finger at its free end which engages beneath one of said members, a stop on the top rail of the gate, and a coil spring connected to the upper end of the vertical arm of the lever and to the top rail of the gate to pull the vertical arm toward and in engagement with the stop.

2. In combination with a central and end posts spaced therefrom, a horizontal rail connected centrally to the central post and at its ends to the end posts, a gate slidable on the rail, a pair of pivotally connected members one of which is pivoted above the central post base thereto and the other of which is pivoted to the bottom gate rail, a housing secured to the central post on an outer side face thereof and having a pair of pulleys therein, a cable connected to the free end of the member pivoted to the central post and being arranged exteriorly of said side face of the central post and being engaged with the rollers, said cable having a pair of strands, said rail having a groove in its rear face which with said side face of the central post forms a passage through which said strands pass, a second housing having a pair of rollers secured to the top of the central post, said strands engaging the respective last named rollers, and means on opposite sides of the central post to movably support each strand.

In testimony whereof I affix my signature, in the presence of two witnesses.

ALVAN W. LIGHTBURNE.

Witnesses:
 THOMAS N. GEORGE,
 WALTER MANLEY.

Copies of this patent may be obtained for five cents each, by addressing the "Commissioner of Patents, Washington, D. C."